US009482053B2

(12) United States Patent
Polzen

(10) Patent No.: US 9,482,053 B2
(45) Date of Patent: Nov. 1, 2016

(54) LADDER SAFETY DEVICE AND METHOD OF ATTACHMENT

(71) Applicant: William D. Polzen, Lake Oswego, OR (US)

(72) Inventor: William D. Polzen, Lake Oswego, OR (US)

( * ) Notice: Subject to any disclaimer, the term of this patent is extended or adjusted under 35 U.S.C. 154(b) by 0 days.

(21) Appl. No.: 14/078,818

(22) Filed: Nov. 13, 2013

(65) Prior Publication Data

US 2014/0131541 A1 May 15, 2014

Related U.S. Application Data

(60) Provisional application No. 61/726,086, filed on Nov. 14, 2012.

(51) Int. Cl.

| | |
|---|---|
| ***E06C 1/00*** | (2006.01) |
| ***E06C 7/18*** | (2006.01) |
| ***E06C 7/42*** | (2006.01) |
| *A47F 5/00* | (2006.01) |
| *E04G 25/00* | (2006.01) |
| *F16M 13/00* | (2006.01) |
| *E06C 7/44* | (2006.01) |
| *E06C 7/08* | (2006.01) |
| *E06C 7/50* | (2006.01) |
| *E06C 1/20* | (2006.01) |
| *E06C 1/22* | (2006.01) |

(52) U.S. Cl.

CPC ............... *E06C 7/188* (2013.01); *E06C 7/423* (2013.01); *E06C 1/20* (2013.01); *E06C 1/22* (2013.01); *E06C 7/086* (2013.01); *E06C 7/44* (2013.01); *E06C 7/50* (2013.01); *Y10T 403/75* (2015.01)

(58) Field of Classification Search

CPC .......... E06C 7/50; E06C 7/086; E06C 7/087; E06C 7/44; E06C 1/20; E06C 1/382; E06C 1/32; E06C 1/22; E06C 7/423; E04G 21/26; E04G 23/0218; E04G 17/14; E04B 2002/8688; E04F 21/185; E04F 21/1822

USPC ........ 248/351, 354.1, 354.5, 354.6; 182/172, 182/166, 168, 171, 173, 174, 165; 52/127.2, 164

See application file for complete search history.

(56) References Cited

U.S. PATENT DOCUMENTS

| | | | | | |
|---|---|---|---|---|---|
| 3,396,928 | A | * | 8/1968 | Lay | 248/188.6 |
| 4,252,313 | A | * | 2/1981 | Skalka | 482/36 |
| 4,519,477 | A | * | 5/1985 | Ralston | 182/107 |
| 4,807,720 | A | * | 2/1989 | Kim | 182/205 |
| 4,880,080 | A | * | 11/1989 | Brockman | B25H 1/06 182/155 |
| 5,481,836 | A | * | 1/1996 | Miller et al. | 52/127.2 |
| 5,511,632 | A | * | 4/1996 | Ermis | E06C 1/22 182/107 |

(Continued)

FOREIGN PATENT DOCUMENTS

CA 2513243 A1 * 2/2007

*Primary Examiner* — Brian Mattei
*Assistant Examiner* — Taylor Morris
(74) *Attorney, Agent, or Firm* — Craig R. Rogers; Simple IP Law, P.C.

(57) ABSTRACT

According to principles of the present inventive concepts, a ladder safety device can include one or more stabilizing legs configured to be removably or permanently attached to a ladder. In a preferred embodiment, an attachment mechanism of the ladder safety device removably attaches to the ladder through rung holes already present in the ladder. The stabilizing legs are preferably secured in the attachment mechanism such that they can be securely oriented at a desired angle extending away from the ladder legs and can be independently extended to have a desired length.

20 Claims, 8 Drawing Sheets

(56) References Cited

U.S. PATENT DOCUMENTS

| | | | | |
|---|---|---|---|---|
| 5,960,905 | A * | 10/1999 | Gardner | 182/129 |
| 6,352,135 | B1 * | 3/2002 | Jones | 182/129 |
| 7,163,084 | B1 * | 1/2007 | Blehm | 182/172 |
| 7,216,742 | B2 * | 5/2007 | Spengler | 182/172 |
| 7,222,695 | B2 * | 5/2007 | Jules et al. | 182/200 |
| 2008/0202043 | A1 * | 8/2008 | Marshall et al. | 52/127.2 |
| 2011/0147121 | A1 * | 6/2011 | Potter | 182/107 |

* cited by examiner

LADDER SAFETY DEVICE AND METHOD OF ATTACHMENT

PRIORITY CLAIM

This application claims priority from U.S. Provisional Patent Application Ser. No. 61/726,086, filed Nov. 14, 2012, the contents of which are incorporated herein by reference in their entirety.

BACKGROUND

Field of the Inventive Concepts

The present inventive concepts relate generally to ladders. More particularly, these inventive concepts relate to a safety device for improving ladder stability and to a method of attaching a ladder accessory to a ladder.

SUMMARY

According to various embodiments and principles of the present inventive concepts, a ladder safety device and method of attachment can provide numerous improvements over the prior art. Conventional ladders can be unstable, particularly on uneven ground. The longer the ladder and the further it is extended, the more unstable and dangerous it may become, particularly on uneven ground surfaces. According to principles of the present inventive concepts, however, a ladder safety device can be used to increase ladder stability and decrease the risk of ladder accidents. In addition, a method of attachment can be used to secure the ladder safety device (or other ladder accessories) to conventional ladders with little or no modification to the ladder itself.

According to one aspect of the present inventive concepts, a ladder safety device comprises a pair of stabilizing legs attached to a ladder through an attachment mechanism. The attachment mechanism is preferably configured to securely, but removably, attach a stabilizing leg to each side of the ladder. The stabilizing legs are preferably each capable of being independently angled away from the ladder at one or more angular positions. The stabilizing legs are further each preferably provided with length adjustment mechanisms to permit a length of each of the legs to be adjusted independently of a length of the other leg. This can facilitate secure placement of the ladder on uneven surfaces.

Feet can be provided on each of the legs such that a base of each foot can be angled to best contact a ground surface. The feet can include a contact surface made from a material, and having a structure and design, that provides a good grip with the ground surface in various weather conditions.

In a preferred embodiment, the attachment mechanism can comprise a pair of alignment tubes configured to be arranged in openings of the rungs in the ladder. A first alignment tube can be placed in the rung opening on one side of the ladder and a second corresponding alignment tube can be placed in the corresponding opening on the opposite side of the ladder. Threaded bolts (or a bar having two threaded ends) can be fed through the attachment mechanism alignment tubes. Nuts can be attached to the bolt ends to secure the attachment mechanism to the ladder. Alignment bars or additional alignment tubes and bolts can be provided to mate within one or more additional rung openings (or other openings in the ladder legs) to help ensure the attachment mechanism and ladder safety device remains appropriately aligned with the ladder. Similar attachment mechanisms could be used to attach other accessories to a ladder.

Various aspects, embodiments, and configurations of the inventive concepts are possible without departing from the principles disclosed herein. The inventive concepts are therefore not limited to any of the particular aspects, embodiments, or configurations described herein.

BRIEF DESCRIPTION OF FIGURES

The foregoing and additional objects, features, and advantages of the present inventive concepts will become more readily apparent from the following detailed description of preferred embodiments, made with reference to the accompanying drawings, in which.

DETAILED DESCRIPTION OF ILLUSTRATIVE EMBODIMENTS

Various features, benefits, and configurations incorporating principles of the present inventive concepts in illustrative embodiments are shown in the accompanying drawings and photographs, the contents of which are incorporated by reference in their entirety. Additional features, benefits and configurations will be readily apparent to those of ordinary skill in the art based on this disclosure and all such features, benefits and configurations are considered to be within the scope of the present inventive concepts. Various illustrative embodiments will now be described in connection with the accompanying drawings and photographs.

Figure 1:
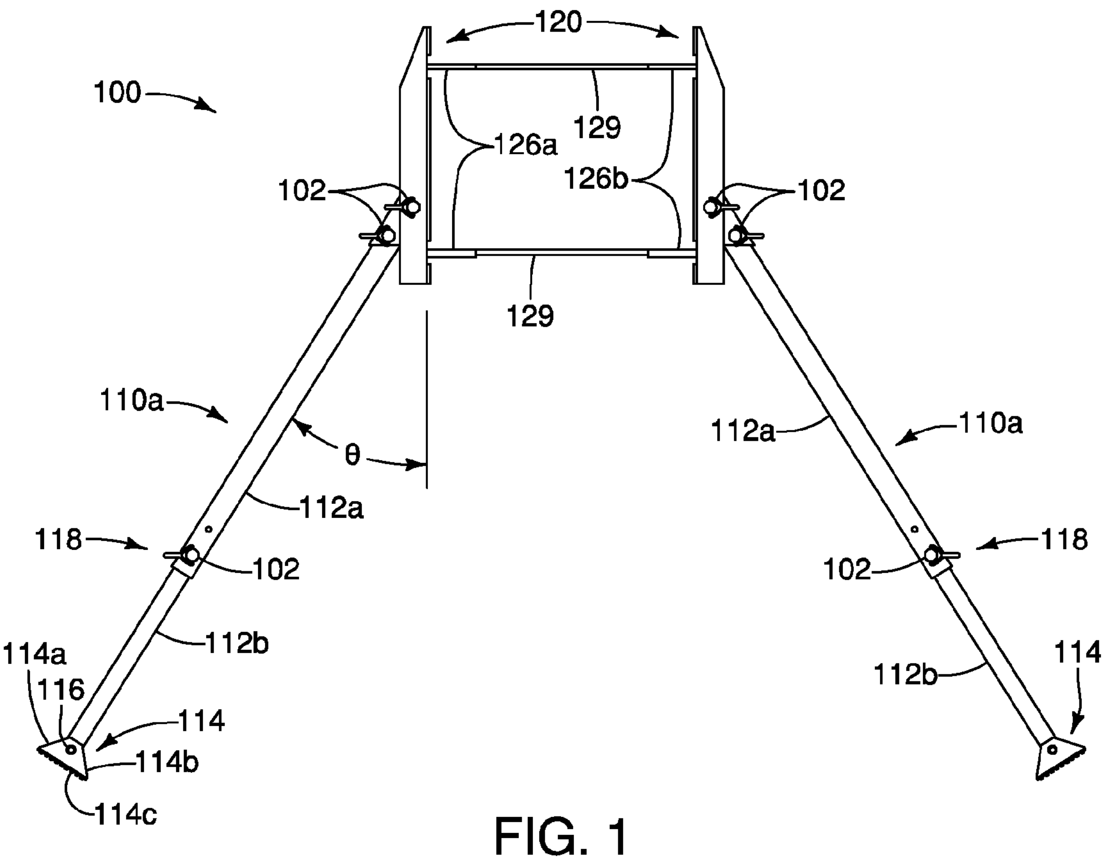
FIG. 1 is a somewhat schematic plan view of the ladder safety device and attachment mechanism according to one embodiment of the present inventive concepts.

FIG. 1 is a somewhat schematic plan view of a ladder safety device 100 constructed according to principles of the present inventive concepts. Referring to FIG. 1, according to one aspect of the present inventive concepts, a ladder safety device 100 preferably comprises a pair of stabilizing legs 110*a*, 110*b* that can be attached to a ladder through an attachment mechanism 120. The attachment mechanism 120 can be configured to securely, but removably, attach a stabilizing leg 110 to one or both sides of the ladder 150 (see FIGS. 5 and 6). The stabilizing legs 110 can be attached such that they are capable of being angled at one or more angular positions θ with respect to the ladder 150.

Anchor pins 102 can be provided through mating holes the legs 110*a*, 110*b* and the attachment mechanism 120 to secure the legs 110*a*, 110*b* to the attachment mechanism 120. The anchor pins 102 can also selectively fix the relationship (or angle) between the legs 110*a*, 110*b* and the attachment mechanism 120, and thereby provide the desired angular position θ with respect to the ladder 150.

The stabilizing legs 110*a*, 110*b* are further each preferably provided with length adjustment mechanisms 118 to permit a length of each of the legs 110*a*, 110*b* to be adjusted independently of a length of the other leg 110*b*, 110*a*, respectively. The length adjustment mechanism 118 can, for instance, include a tube-in-tube leg design, wherein a bottom leg segment 112*b* is slidably arranged within a top leg segment 112*a* (or vice versa). An anchor pin 102 can be inserted through mating holes in the leg segments 112*a*, 112*b* to lock the leg in the desired length. This can facilitate secure placement of the ladder 150 on uneven ground surfaces (see FIGS. 7A and 7B).

Figure 9A:
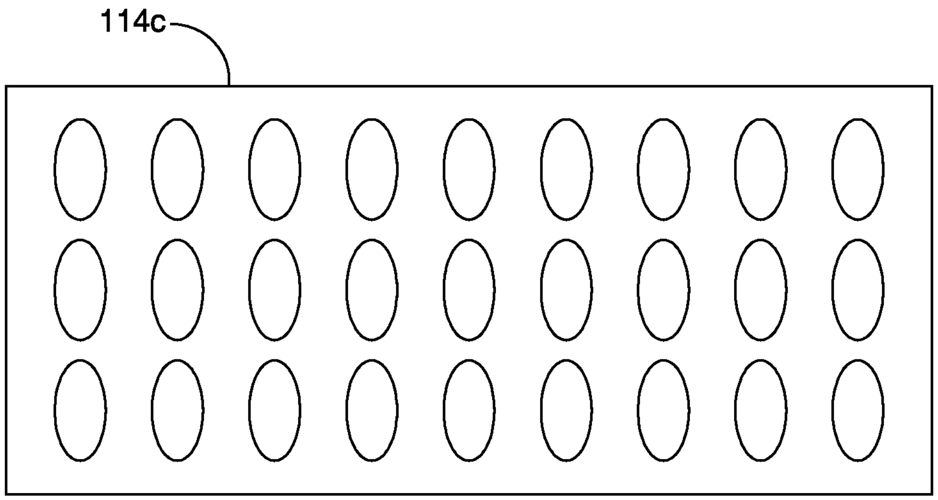
FIGS. 9A and 9B are somewhat schematic plan and side views of a contact surface for a foot of the ladder safety device according to other aspects of the present inventive concepts.
Figure 9B:
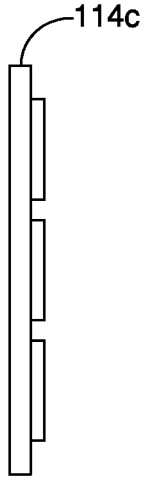

Feet 114 can be provided on each of the legs 110*a*, 110*b* such that a base 114*b* of each foot can be angled to best contact a ground surface. For instance, the feet 114 can be attached with a single bolt or pin 116 arranged through a sidewall 114*a* extending upward from the base 114*b* of the foot such that it provides a pivot point for enabling the foot base 114*b* to rotate with respect to the leg 110*a*. The feet 114 can include a contact surface 114*c* on the bottom of each foot base 114*b* made from a material (e.g., rubber, slip-resistant plastic, etc.) and/or having a structure and design (e.g., contoured rubber, metal, or plastic plate or spikes, etc.) that provides a good grip with the ground surface in various weather conditions (see, e.g., FIGS. 9A and 9B).

Figure 2A:
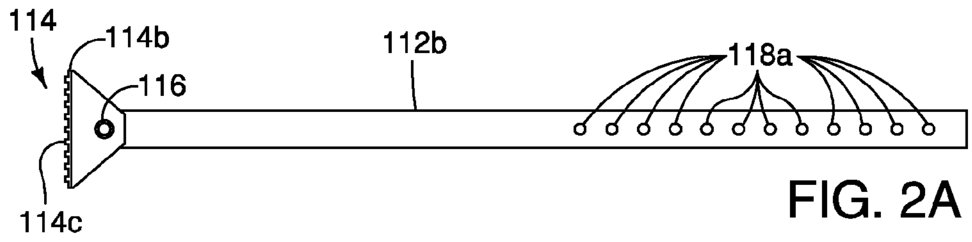
FIGS. 2A and 2B are somewhat schematic plan and side views, respectively, of a bottom leg segment of the ladder safety device of FIG. 1, according to further aspects of the present inventive concepts.
Figure 2B:
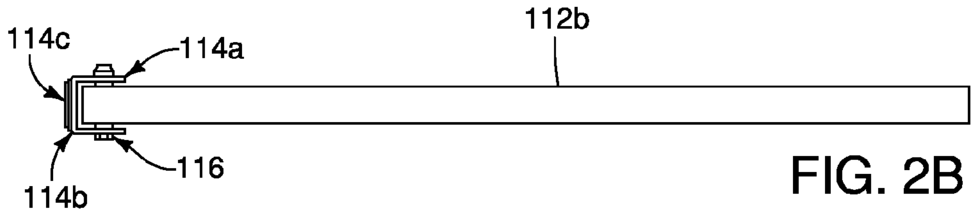
Figure 3:
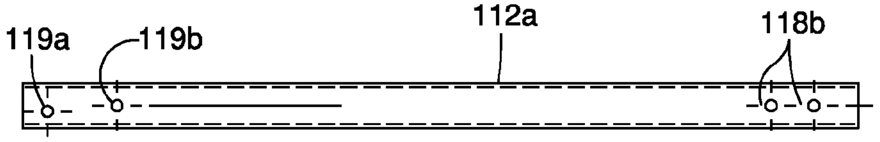
FIG. 3 is a somewhat schematic view of a top leg segment of the ladder safety device of FIG. 1, according to another aspect of the present inventive concepts.

FIGS. 2A and 2B are somewhat schematic plan and side views of a bottom leg segment 112*b* of a leg 110 of the ladder safety device of FIG. 1. FIG. 3 is a somewhat schematic plan view of a top leg segment 112*a* of the ladder safety device 100 of FIG. 1. Referring now to FIGS. 2A through 3, the structure and operation of the stabilizing legs 110*a*, 110*b* will now be described in further detail.

As explained previously with respect to FIG. 1, each of the stabilizing legs 110*a*, 110*b* can be provided with an adjustment mechanism 118 that facilitates adjustment of a length of the leg. In an adjustment mechanism 118 having a tube-in-tube design, the bottom leg segment 112*b* can be configured to slidably mate inside an internal tube of the top leg segment 112*a* (or vice versa). The bottom leg segment 112*b* or top leg segment 112*a* can be configured with a plurality of holes 118*a* and the other mating leg segment 112*a* or 112*b* can also be provided with one or more holes 118*b*. An anchor pin 102 (see FIG. 1) can be selectively arranged through mating holes 118*a*, 118*b* in the leg segments 112*a*, 112*b* to secure the leg in a desired length. Additional holes 119 can be provided in the top leg segment 112*a*, to mate with corresponding holes 121 in the attachment mechanism 120 (see FIG. 4C).

Figure 4A:
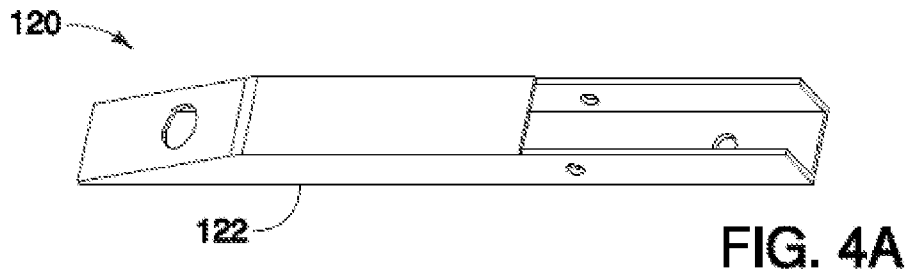
FIGS. 4A to 4C are somewhat schematic views of an attachment mechanism for attaching a ladder safety device to a ladder according to an embodiment of the present inventive concepts.
Figure 4B:
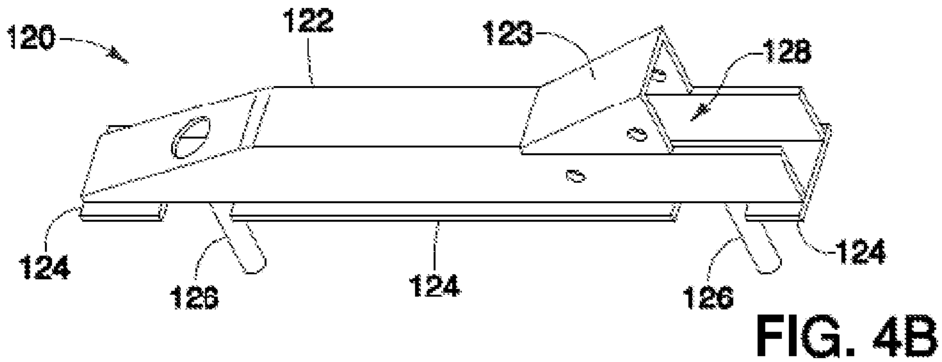
Figure 4C:
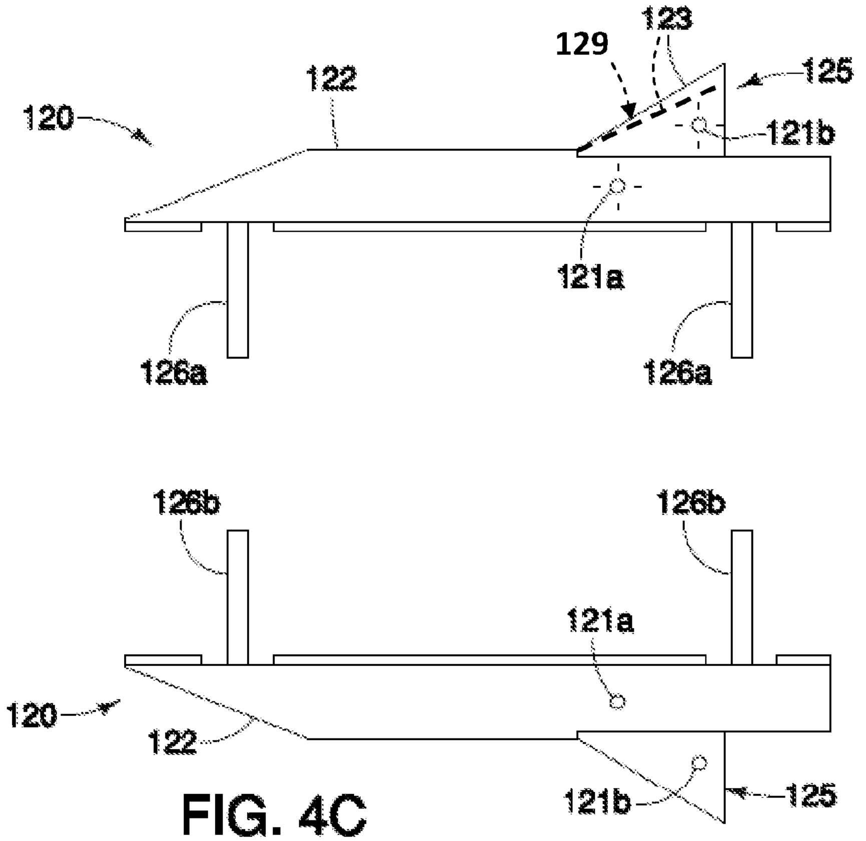

FIGS. 4A through 4C provide various somewhat schematic illustrations of an attachment mechanism 120 for attaching the ladder safety device 100 of FIG. 1 to a ladder, according to additional principles of the present inventive concepts. Referring additionally to FIGS. 4A through 4C, the attachment mechanism 120 can include a main body 122. The main body 122 can have a plurality of base plates 124 welded thereto to abut against an attached ladder 150 (see, e.g., FIG. 5). One or more alignment tubes 126 can also be secured to the attachment mechanism 120 for instance by welding), and can be configured to be arranged in openings of the rungs in the ladder 150. Mirroring attachment mechanisms 120 can be provided on opposite sides of the ladder 150.

More specifically, one alignment tube 126*a* can be placed in a rung opening on one side of the ladder 150 and a corresponding alignment tube 126*b* can be placed in a corresponding rung opening on the opposite side of the ladder. Threaded bolts (or a bar having two threaded ends) 129 can be fed through the attachment mechanism alignment tubes 126*a*, 126*b*. Nuts (not shown) can be attached to ends of the bolt 129 to secure the attachment mechanism 120 to the ladder. Alignment bars or pegs (not shown), or additional alignment tubes 126 and bolts 129 can be provided to mate within one or more additional rung openings (or other openings in the ladder legs) to help ensure the attachment mechanism and ladder safety device remains appropriately aligned with the ladder 150.

Figure 5:
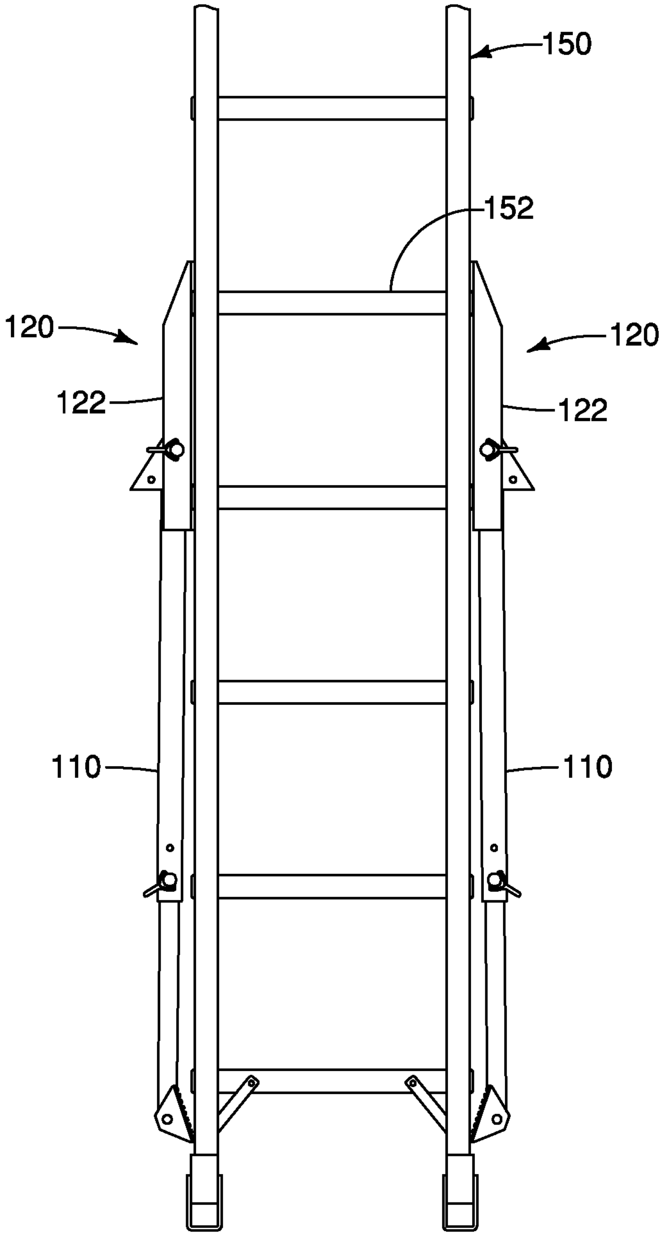
FIG. 5 is a somewhat schematic illustration of a ladder safety device attached to a ladder and arranged in a storage position, according to another aspect of the present inventive concepts.
Figure 6:
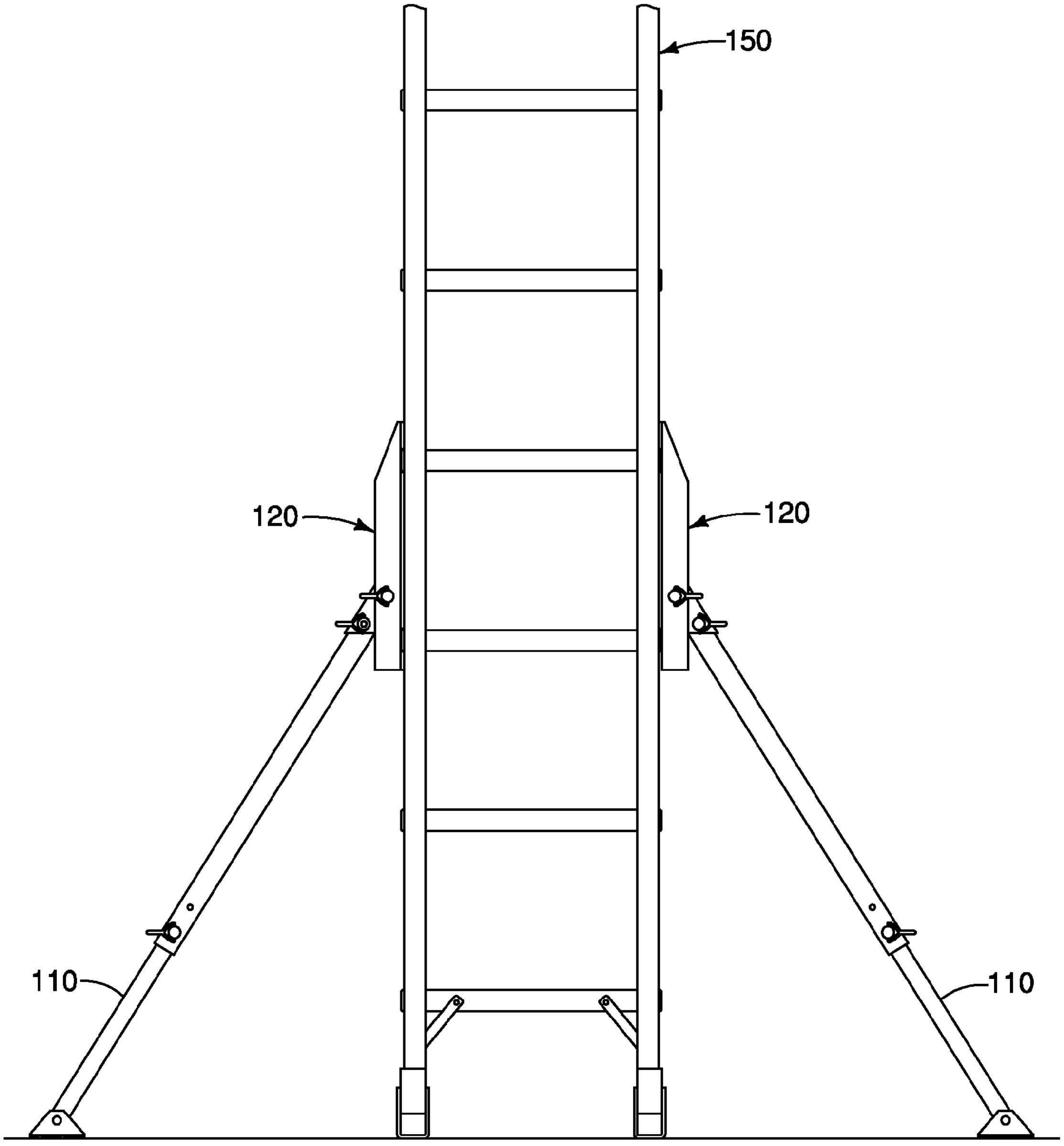
FIG. 6 is a somewhat schematic illustration of a ladder safety device attached to a ladder and arranged in a stable support position on level ground according to yet another aspect of the present inventive concepts.

FIGS. 5 and 6 are somewhat schematic illustrations of a ladder safety device 100 attached to a ladder 150 in a storage and a deployed relationship, respectively. Referring additionally to FIGS. 5 and 6, a method of attaching a ladder safety device 100 to a ladder 150 will now be described in further detail. Of course, it should be noted that these steps can be provided in any desired order and the method is not limited to the specific order disclosed herein.

First, the ladder 150 is deployed (extended to a desired length). One or more attachment mechanisms 120 can then be used to secure the legs 110 to the ladder 150. A base attachment 122 is the first part of the assembly to be attached and secured to the ladder 150. The base attachment 122 of the ladder safety device can include right and left side base structures 122 along with alignment tubes 126 to facilitate an easy attachment.

To begin assembly, the right and left side base structures 122 are aligned with their respective sides of the ladder 150. Alignment tubes 126 are used to line up the base attachment 122 with the openings (not shown) of the desired rung(s) 152 on the ladder 150 on both the left and right sides. For instance, alignment tubes 126 arranged near the top of both left and right side base attachments 122 can be put into openings in the fourth rung up from the bottom of the ladder 150.

To secure the base attachments 122 to the ladder 150, two threaded bolts (or a rod having two threaded ends) 129 can be fed through the base attachment alignment tubes 126. Once fed through left and right base attachment alignment tubes 126, a nut (not shown) can be attached and secured on each of the threaded bolt or rod ends. Once the nuts are tightened securely against inside walls of the base attachments 122, the rest of the ladder safety device 100 can be attached.

Stabilizing legs 110 are preferably inserted into a receptacle 128 arranged at the bottom of each of the secured base attachments 122. The stabilizing legs 110 are preferably sized and shaped to have a good fit with the inside of the receptacles 128. Once fitted inside the base attachment receptacles 128, a through top hole 121*a* in each base attachment 122 preferably lines up with a through hole 119*a* in a corresponding one of the stabilizing legs 110. Once the holes are aligned, a locking pin 102 can be inserted to securely attach the stabilizing leg 110 to the respective base attachment 122.

Each stabilizing leg 110 can then be pulled out at an angle θ where it meets flush with an alignment wall 123 of the base attachment 122. The alignment wall 123 can, for instance, be an outer wall of the receptacle 128, or a wall of an alignment insert 129 corresponding to a different desired angle. The alignment wall 123 can be configured to line up the stabilizing legs at a desired angle θ to provide stability to the ladder 150. Alternatively, the entire receptacles 128 themselves can be arranged at the desired angle θ from the base attachments 122.

The sidewalls 123 of the receptacles 128 can be part of a protrusion 125 from the base attachment 122. In this configuration, receptacle through holes 121*b* can be arranged through the protrusions 125 on the base attachments 122 to line up with second through holes 119*b* on the stabilizing legs. Locking pins 102 can be inserted through the receptacle through holes 121*b* and second through holes 119*b* to lock the stabilizing legs 110 in their extended position away from the base of the ladder 150.

The stabilizing legs could be enabled to be deployed at different angles away from the ladder legs by using an attachment mechanism that permits the stabilizing legs to be deployed at any one of multiple desired angles. For instance, the ladder safety device may include an angle adjustment mechanism configured to permit adjustment of an angle of the stabilizing legs with respect to the ladder legs. The angle adjustment mechanism, may, for instance, comprise an angled bracket and a removable locking pin, wherein the locking pin is configured to lock the stabilizing leg in the angled bracket at a desired angle. Various through holes could be provided, for instance, to permit the stabilizing legs to be deployed at multiple different angles from the ladder legs.

Each of the legs 110 can be provided with a telescoping feature that allows them to be adjusted to a desire length. For instance, each leg can comprise an inner leg structure 112*b* and an outer leg structure 112*a*. A receiving hole (not shown) in the outer leg structure 112*a* can allow the inner leg structure 112*b* to slide within the outer leg structure 112*a* to provide a variable length for the overall leg structure 110. A plurality of length setting through holes 118*a* can be arranged on each inner leg structure 112*b*, with one or more leg length locking through holes 118*b* arranged on the outer leg structure 118*a*. With each leg 110 set at a desired length, locking pins 102 can be inserted through the leg length locking through hole 118*b* and a desired one of the leg length setting through holes 118*a* on each leg 110 to lock the length of each of the stabilizing legs 110 at its desired length.

Figure 7A:
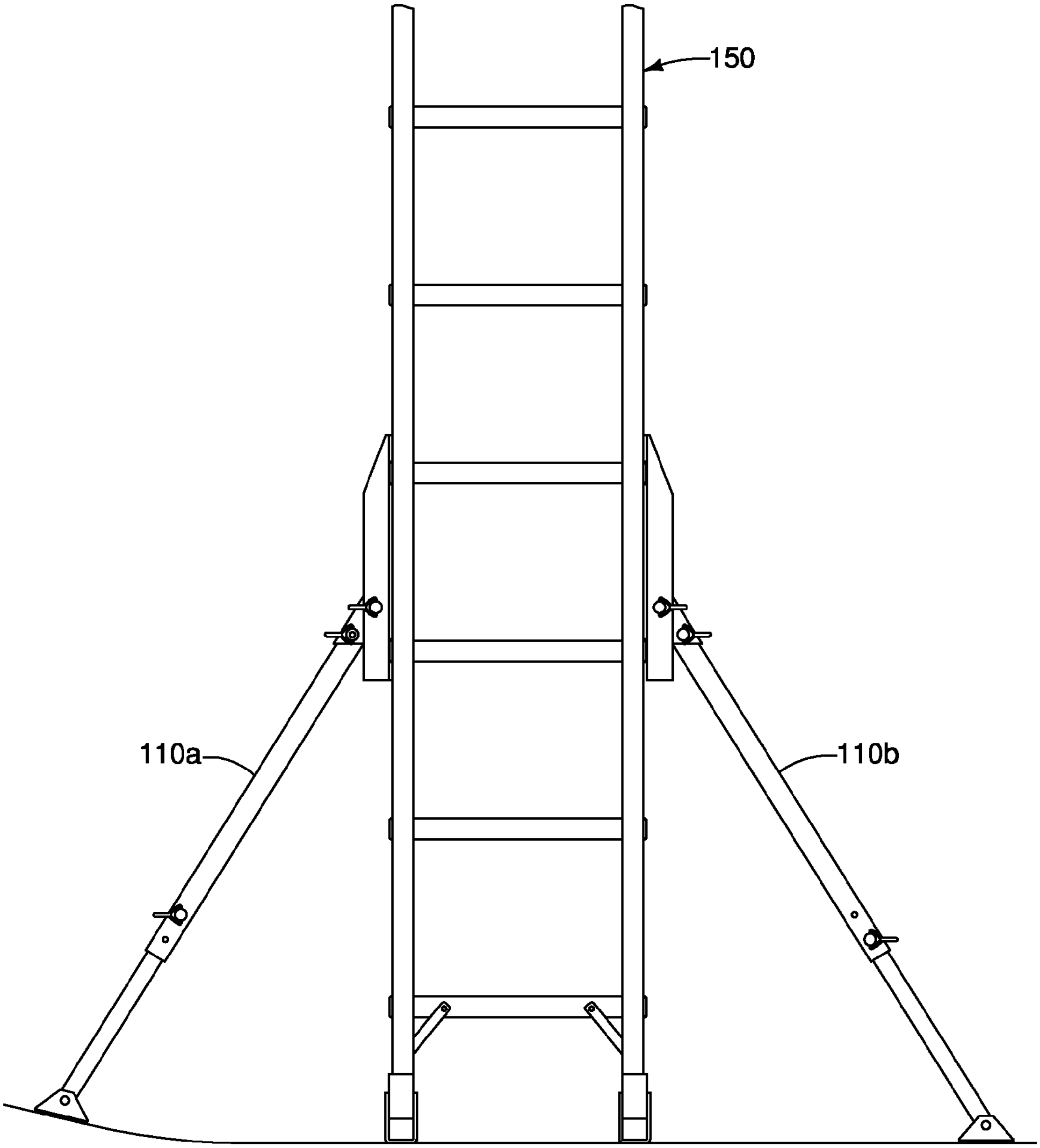
FIGS. 7A and 7B are somewhat schematic illustrations of a ladder safety device attached to a ladder and arranged in a stable support position on uneven ground according to still further aspects of the present inventive concepts.
Figure 7B:
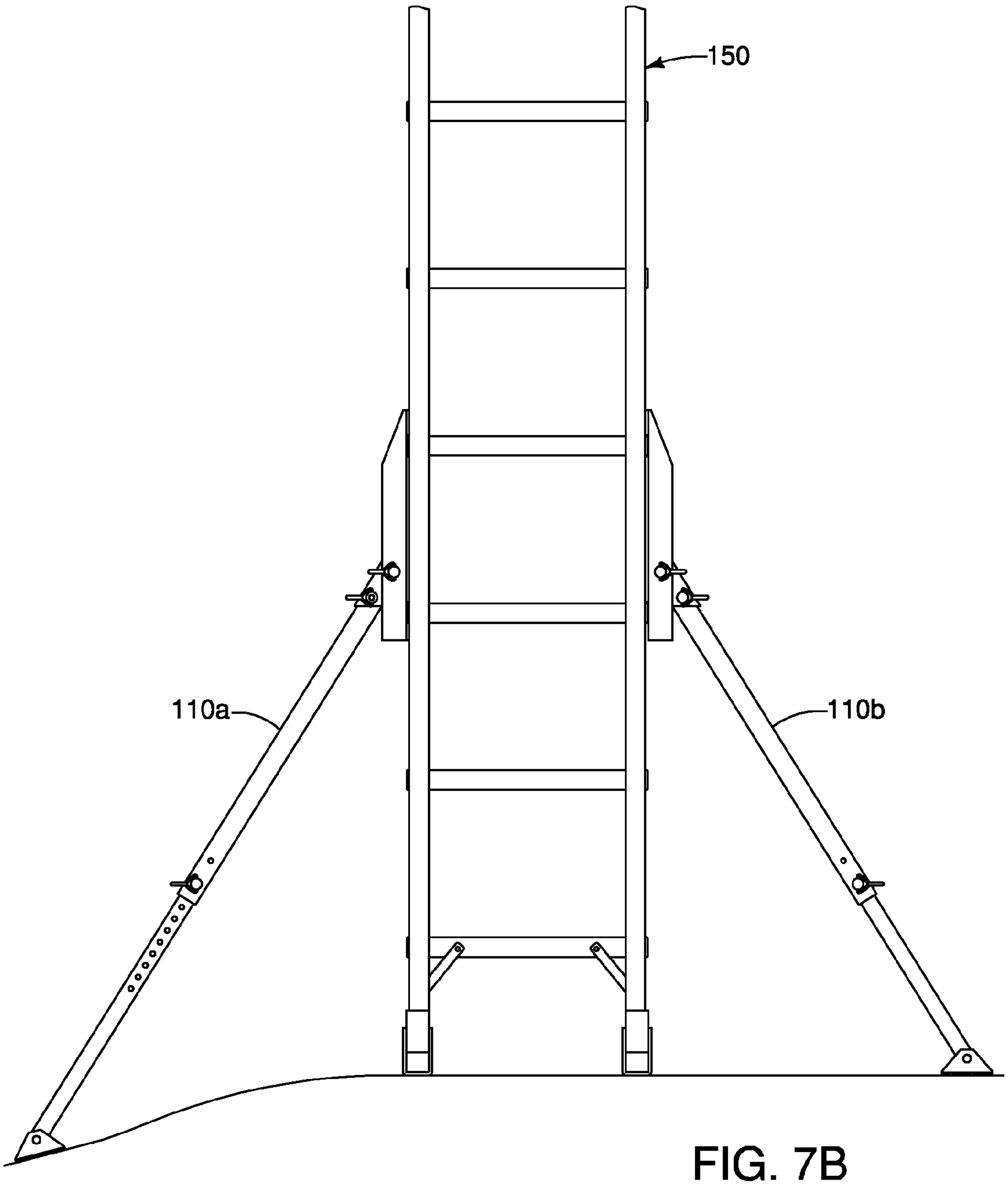

FIGS. 7A and 7B illustrate use of the ladder safety device 100 on uneven ground conditions. Referring now additionally to FIGS. 7A and 7B, each of the legs 110 can be extended to a desired length to contact a ground surface and stabilize the ladder 150. For instance, a length of the first leg 110*a* can be set either shorter (FIG. 7A) or longer (FIG. 7B) than the length of the second leg 110*b* to accommodate ladder placement along an uphill or downhill slope, respectively. The feet 114 on the stabilizing legs 110 can further rotate to match an angle of the ground surface, and contact surfaces 114*b* on the feet can help ensure good traction to prevent the legs 110 from slipping.

Figure 8A:
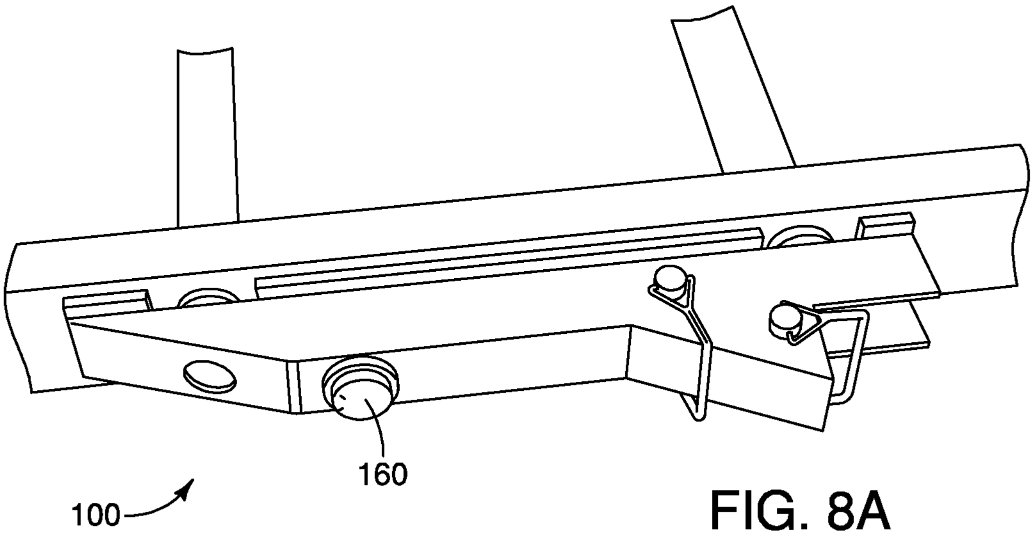
FIGS. 8A and 8B are somewhat schematic illustrations of additional accessories that may be provided on the attachment mechanism of the ladder safety device according to still further embodiments of the present inventive concepts.
Figure 8B:
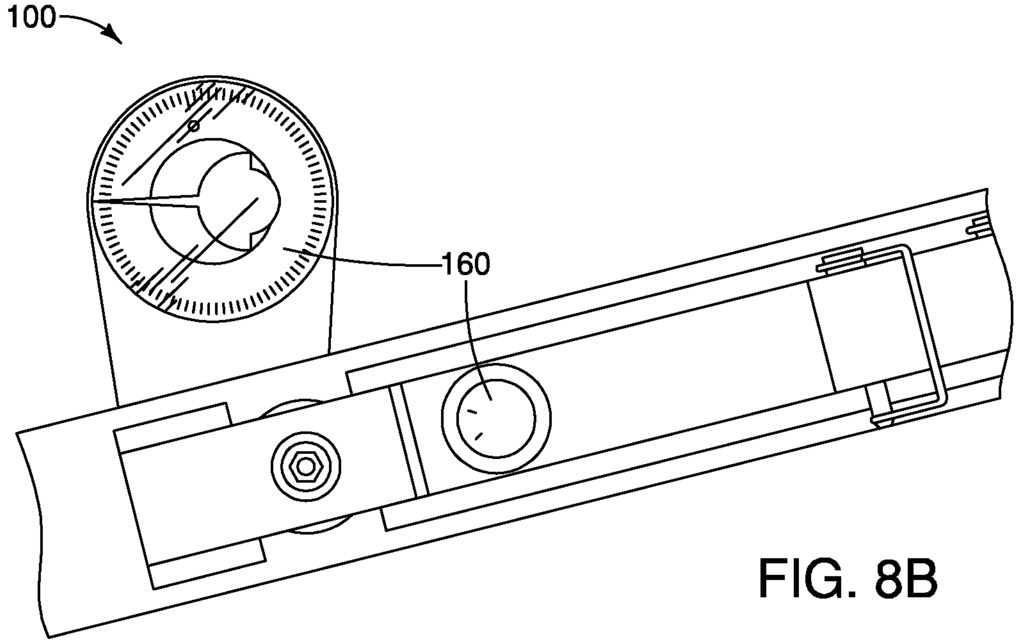

FIGS. 8A and 8B are somewhat schematic illustrations providing examples of further accessories that can be provided to the ladder safety device 100. Referring now to FIGS. 8A and 8B, the ladder safety device 100 can further include one or more gauges 160 indicating a level of inclination of the ladder 150 to facilitate a quick determination of whether the ladder is inclined at a potentially dangerous angle. Other accessories could also be provided to the ladder safety device to promote safe ladder usage.

Having described and illustrated principles of the present inventive concepts in various preferred embodiments thereof, it should be apparent that the inventive concepts can be modified in arrangement and detail without departing from such principles.

For instance, although various mechanical structures are shown for attaching the base attachments to the ladder, other methods of attaching the base attachments to the ladder are also contemplated. Separate bolt holes could be drilled or formed in the ladder legs, for instance, with bolts used to secure the base attachments to the legs through the holes. The base attachment of the ladder safety device could alternatively be welded to or formed integrally with the ladder legs such that it forms a permanent part of the ladder. In addition, any number of rung alignment pins or through bars could be included to provide additional stability, and the base attachments could be any desired length to facilitate additional rung alignment pins or bars.

In addition, although various preferred mechanisms for adjusting the length and extension angles of the stabilizing legs, and for locking these positions in place, have been disclosed and described, various other methods for adjusting these features and securing them could also be provided. For instance, the inner leg structures could be provided with depressible pins that are spring-biased toward a protruding position. Depressing the pins could permit movement from one position of the inner leg structures to a different position, thereby facilitating leg length adjustment.

Furthermore, the stabilizing legs could be enabled to be deployed at different angles away from the ladder legs by using an attachment mechanism that permits the stabilizing legs to be deployed at any one of multiple desired angles. Various through holes could be provided, for instance, to permit the stabilizing legs to be deployed at multiple different angles from the ladder legs. The stabilizing legs can be further configured to fold up against the ladder legs to facilitate transportation and storage with the ladder safety device attached to the ladder. Other mechanical structures such as ratcheting mechanisms, gears, or other devices could also be used to permit the legs to extend from the ladder at a desired angle and be securely locked into place.

Accordingly, the present inventive concepts should not be construed as being limited to the preferred embodiments disclosed herein, but should encompass all such modifications and variations failing within the spirit and scope of the inventive concepts as defined by the following claims.

What is claimed is:

1. A ladder safety device comprising:

one or more base attachments configured to be securely attached to a ladder, each base attachment comprising:

one or more alignment members extending from a base of the base attachment and configured to extend into but not through an opening in a rung of the ladder, such that a gap exists between the alignment member on one base attachment and a corresponding alignment member on an opposing base attachment when opposing base attachments are secured to the ladder; and a receptacle for receiving a stabilizing leg therein, said receptacle comprising an opening sized and configured to receive the stabilizing leg therein and an alignment wall providing an outermost wall of the receptacle, wherein the alignment wall is arranged at a first predetermined angle with respect to the base of the base attachment to prevent a stabilizing leg arranged within the receptacle from rotating away from the base beyond the first predetermined angle, wherein the predetermined angle is greater than zero degrees but less than ninety degrees;

one or more stabilizing legs each configured to be attached to a respective base attachment to stabilize the ladder when the one or more base attachments are securely attached to the ladder and the one or more stabilizing legs are arranged in a deployed position; and one or more contact surfaces arranged on each of the stabilizing legs and configured to contact a ground surface at a position located a distance away from the respective ladder leg when the stabilizing leg is arranged in the deployed position.

2. The ladder safety device of claim 1, wherein each base attachment further comprises:

one or more base plates secured to the base of the base attachment and configured to abut against the ladder when the base attachment is attached to the ladder.

3. The ladder safety device of claim 1, wherein the ladder safety device comprises:

two opposing base attachments and two stabilizing legs, each base attachment configured to secure a corresponding stabilizing leg to a corresponding leg of the ladder;

wherein the one or more alignment members each comprise a tube configured to fit within the opening in the rung on the ladder; and wherein the ladder safety device further comprises one or more securing mechanisms each configured to fit through corresponding tubes of the opposing base attachments and extend through the opening in the rung on the ladder to secure both of the opposing base attachments to their corresponding ladder legs.

4. The ladder safety device of claim 1, wherein each attachment mechanism comprises an adjustment mechanism for adjusting an angle of the attached stabilizing leg with respect to the ladder leg and securing the attached stabilizing leg in the adjusted position, such that the attached stabilizing leg can be arranged and secured in either a storage position, with the stabilizing leg positioned and secured in a vertically downward position abutting a corresponding ladder leg, or in a deployed position, with the stabilizing leg arranged at the predetermined angle from the base.

5. The ladder safety device of claim 1, further comprising:

an angle adjustment mechanism configured to permit adjustment of an angle of the stabilizing legs with respect to a corresponding one of the ladder legs.

6. The ladder safety device of claim 5, wherein the angle adjustment mechanism comprises an angled bracket and a removable locking pin, wherein the locking pin is configured to lock the stabilizing leg in the angled bracket at a desired angle.

7. The ladder safety device of claim 1, further comprising length adjustment mechanisms for each of the stabilizing legs to permit a length of each stabilizing leg to be adjusted to a desired length to permit the one or more contact surfaces on each of the stabilizing legs to contact an uneven ground surface, wherein each of the length adjustment mechanisms comprises a larger tube connected to the base attachment and a smaller tube slidably arranged within the larger tube.

8. The ladder safety device of claim 7, wherein the relationship between the smaller tube and the larger tube is lockable in any one of multiple relationships corresponding to different stabilizing leg lengths.

9. The ladder safety device of claim 7, further comprising a locking mechanism configured to secure the length of the stabilizing leg in its desired length when said locking mechanism is in place.

10. The ladder safety device of claim 1, wherein the stabilizing leg is hingedly connected to the base attachment at a fixed position.

11. The ladder safety device of claim 1, further comprising:

an alignment insert configured fit within the receptacle to provide a second alignment wall arranged at a second predetermined angle that is different than the first predetermined angle, said alignment insert configured to prevent a stabilizing leg arranged within the receptacle having the alignment insert arranged therein from rotating away from the base beyond the second predetermined angle.

12. A ladder safety device, comprising:

a pair of attachment mechanisms configured to be arranged on and attached to opposite sides of a ladder, each attachment mechanism comprising:

a base configured to abut against a leg of the ladder;

one or more alignment tubes configured to be partially inserted into one or more rungs of the ladder; and a receptacle having an inner opening and an alignment wall, said alignment wall arranged at a fixed location with respect to the attachment mechanism and further arranged at a first predetermined angle that is greater than zero degrees but less than ninety degrees with respect to a base of the attachment mechanism; and said ladder safety device further comprising a pair of stabilizing legs, each stabilizing leg configured to fit within the inner opening of the receptacle of a corresponding one of the pair of attachment mechanisms and be hingedly connected to the corresponding attachment mechanism at a fixed position, and wherein the alignment wall is configured to abut against the corresponding stabilizing leg to prevent rotation of an inserted stabilizing leg away from the ladder beyond the first predetermined angle.

13. The ladder safety device of claim 12, wherein each of the attachment mechanisms further comprises:

an alignment insert configured to provide a second alignment wall arranged at a second predetermined angle that is different than the first predetermined angle of the alignment wall of the receptacle, wherein the second alignment wall is configured to prevent rotation of an inserted stabilizing leg away from the ladder beyond the second predetermined angle;

a locking mechanism configured to lock the corresponding stabilizing leg in either a deployed position or a storage position; and wherein, in the deployed position, the stabilizing leg is locked extending at the first or second predetermined angle away from the corresponding ladder leg, and wherein, in the storage position, the stabilizing leg is locked in a vertically downward position abutting against the corresponding ladder leg.

14. The ladder safety device of claim 13, wherein the locking mechanism comprises mating holes arranged through sidewalls of the receptacle and the stabilizing leg and pins configured to be inserted through the mating holes.

15. The ladder safety device of claim 12, wherein the base of a corresponding one of the attachment mechanisms comprises one or more base plates configured to abut against the ladder when the attachment mechanism is attached to the ladder.

16. The ladder safety device of claim 12, further comprising:

a through bolt configured to extend through corresponding alignment tubes on the pair of attachment mechanisms and through a rung on the ladder.

17. A ladder safety device comprising:

a base attachment for attaching the ladder safety device to a ladder, said ladder safety device comprising one or more stabilizing legs, and said base attachment comprising:

an attachment body comprising a receptacle configured to receive a stabilizing leg into the receptacle, and an alignment wall configured to prevent over-rotation of the stabilizing leg;

one or more alignment mechanisms arranged on the attachment body and configured to be inserted into one or more rungs of the ladder;

one or more securing mechanisms for securing the attachment body to the ladder; and an alignment insert configured to fit within the receptacle to provide a second alignment wall configured to prevent over-rotation of the stabilizing leg when inserted into the receptacle.

18. The ladder safety device of claim 17, wherein each alignment mechanism comprises an alignment tube configured to be only partially inserted into a rung of the ladder, wherein the securing mechanism comprises a securing mechanism configured to be inserted through the alignment tube and the rung of the ladder.

19. The ladder safety device of claim 17, further comprising a gauge arranged on a base of the base attachment, said gauge indicating a level of inclination of the ladder.

20. The ladder safety device of claim 17, wherein the stabilizing leg is hingedly connected to the base attachment at a fixed position.

* * * * *